United States Patent [19]

Sase et al.

[11] Patent Number: 4,551,761
[45] Date of Patent: Nov. 5, 1985

[54] SIGNAL PROCESSING CIRCUIT INCLUDING IMAGE SENSOR

[75] Inventors: Masatoshi Sase, Kanagawa; Seisuke Yamanaka, Tokyo, both of Japan

[73] Assignee: Sony Corporation, Tokyo, Japan

[21] Appl. No.: 582,621

[22] Filed: Feb. 22, 1984

[30] Foreign Application Priority Data

Feb. 25, 1983 [JP] Japan ............................. 58-26780[U]

[51] Int. Cl.⁴ .............................................. H04N 3/15
[52] U.S. Cl. .................................................. 358/213
[58] Field of Search ................ 358/221, 213, 41, 212, 358/172, 171

[56] References Cited

U.S. PATENT DOCUMENTS 4,295,161 10/1981 Hettiger .............................. 358/172
4,455,574 6/1984 Hashimoto et al. ................. 358/213

Primary Examiner—Gene Z. Rubinson
Assistant Examiner—Stephen Brinich
Attorney, Agent, or Firm—Lewis H. Eslinger; Alvin Sinderbrand

[57] ABSTRACT

A signal processing circuit comprises an image sensor having an optical black level detecting portion, a buffer circuit for receiving an output signal from the image sensor, a clamping circuit for receiving an output from the buffer circuit, and a low-pass filter provided between the buffer circuit and the clamping circuit. This low-pass filter is made operative by a switching circuit in the interval responsive to the black level detecting portion in the output signal of the image sensor, while it is made inoperative in the interval responsive to the image pickup signal detecting portion. According to this circuit, the black level drift can be followed, thereby preventing the appearance of line noise on the screen without being influenced by the sag component due to the AC coupling.

6 Claims, 5 Drawing Figures

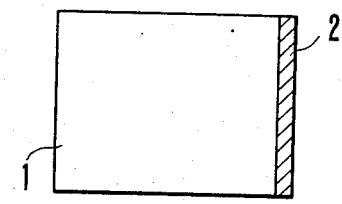
F I G. 1
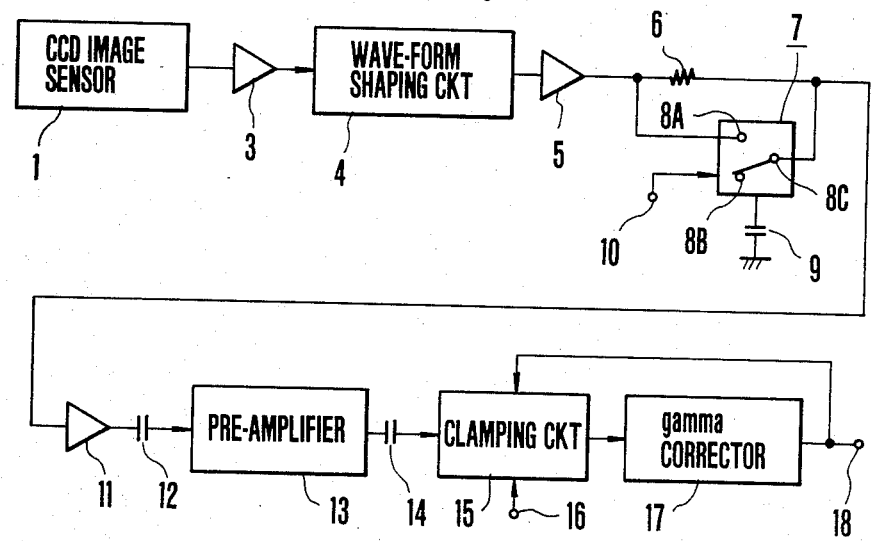
F I G. 2
F I G. 3A
F I G. 3B
F I G. 3C

SIGNAL PROCESSING CIRCUIT INCLUDING IMAGE SENSOR

BACKGROUND OF THE INVENTION

1. Field of the Invention

The present invention relates to a signal processing circuit including an image sensor and, more particularly, to an improvement in a clamping operation which is performed by the processor.

2. Description of the Prior Art

An output signal of an image sensor is supplied through a pre-amplifier to a gamma correction circuit. Since the gamma correction circuit is the non-linear circuit, its input signal is needed to be matched with a constant DC level. On the other hand, the output signal of the image sensor has a variation in its DC potential, so that it is transmitted by being AC coupled to absorb this variation. For this purpose a clamping circuit is provided at the front stage of the gamma correction circuit.

The clamping circuit serves to clamp the image pickup signal so that the black level thereof becomes a predetermined DC potential. To this end a black level detecting portion (generally referred to as an optical black) consisting of a light shielding mask is provided in a portion of the image pickup surface of the image sensor (or image pickup device) and the interval corresponding to this black level detecting portion is clamped into a predetermined DC potential. However, since a noise is included in this interval of the black level detecting portion, the clamping circuit will have made the portion where the noise was added to the black level constant, so that it is impossible to expect the inherent operation to make the black level constant.

To reduce the influence of this noise, it is considered to perform the clamping operation with respect to the mean value of the black levels of a few times (in which the noise component was canceled) instead of the black level of one time. However, in this method, the influence of the noise can be fairly reduced, but on the contrary, there occurs a problem such that it is impossible to completely eliminate the sag component to be caused due to the AC coupling of the circuit at the front stage.

SUMMARY OF THE INVENTION

It is an object of the present invention to provide a signal processing circuit for an image sensor which can perform the clamping operation in which the influences of the noise and sag were eliminated.

Another object of the present invention is to provide a signal processing circuit for an image sensor which can follow the drift of the black level.

Still another object of the present invention is to provide a signal processing circuit for an image sensor in which an S/N ratio of an image pickup signal output does not deteriorate.

These objects are accomplished by a signal processing circuit for an image sensor comprising: an image sensor having an optical black level detecting portion; a buffer circuit to which an output signal of this image sensor is supplied; a clamping circuit to which an output of this buffer circuit is supplied; and a low-pass filter provided between the buffer circuit and the clamping circuit, whereby this low-pass filter being made operative in the interval corresponding to the black level detecting portion in the output signal of the image sensor.

The present invention will be apparent from the following detailed description taken in conjunction with the accompanying drawings.

BRIEF DESCRIPTION OF THE DRAWINGS

FIG. 1 is a schematic diagram of an optical black level detecting portion in one embodiment of the present invention;

FIG. 2 is a block diagram of an embodiment of the present invention; and

FIGS. 3A, 3B and 3C are diagrams of waveforms which are developed during the operation of an embodiment of the present invention.

DESCRIPTION OF THE PREFERRED EMBODIMENT

One embodiment of the present invention will be described hereinbelow with reference to the drawings. In FIG. 1, a reference numeral 1 denotes an image sensor, for example, a CCD image sensor of a color video camera. A black level detecting portion 2 consisting of a light shielding portion like a stripe is provided on the side of end of scanning in the horizontal direction of this image sensor 1. An output signal of this image sensor 1 is supplied through a buffer amplifier 3 to a waveform shaping circuit 4 as shown in FIG. 2. The waveform shaping circuit 4 consists of a sample and hold circuit and its output signal is supplied to a buffer circuit 5. This buffer circuit 5 has a low-output impedance.

An output terminal of this buffer circuit 5 is connected through a resistor 6 to an input terminal of a buffer circuit 11 of the high-input impedance and at the same time it is connected to one input terminal 8A of circuit means including a switching circuit 7. The other input terminal 8B of this switching circuit 7 is grounded through a capacitor 9. The switching circuit 7 is controlled by a switching pulse to be supplied from a terminal 10. The input terminal 8A is connected to an output terminal 8C in the interval when this switching pulse is at a low level, while the input terminal 8B is connected to the output terminal 8C in the interval when the switching pulse is at a high level.

When the input terminal 8B of the switching circuit 7 is selected, the circuit means assumes a low-pass filter configuration consisting of the resistor 6 and capacitor 9. On the other hand, when the input terminal 8A is selected, the low-pass filter is not constituted but the resistor 6 is shorted and the output terminal of the buffer circuit 5 and the input terminal of the buffer circuit 11 are directly coupled so that the circuit means assumes a low-impedance configuration. The cut-off frequency of the low-pass filter consisting of the resistor 6 and capacitor 9 is set to such an extremely low value as to respond to drift of the black level of the image pickup output due to a change in temperature or the like. In addition, in the case where the operation of the low-pass filter is off, an additional impedance is inserted into the signal line; therefore, the resistor 6 is shorted to prevent the S/N ratio of the signal from deteriorating.

An output terminal of the buffer circuit 11 is connected through a coupling capacitor 12 to an input terminal of a pre-amplifier 13. An output terminal of this pre-amplifier 13 is connected through a coupling capacitor 14 to an input terminal of a clamping circuit 15. A gamma correction circuit 17 is connected to this clamping circuit 15 and the image pickup output signal which is gamma-corrected is obtained from an output terminal 18. A clamping pulse is supplied from a terminal 16 to the clamping circuit 15. The clamping circuit 15 consists of for example a feedback clamping circuit.

In one embodiment of the present invention mentioned above, the image pickup signal in which an interval $T_B$ corresponding to the black level detecting portion at the end of each 1H (horizontal interval) exists and to which noise is added is obtained at the output of the buffer circuit 5 as shown in FIG. 3A. In addition, as shown in FIG. 3B, a switching pulse which assumes a high level in the interval $T_B$ responsive to the black level detecting portion is supplied from the terminal 10 to the switching circuit 7, so that the low-pass filter is constituted only in this interval $T_B$. Therefore, the mean value of the level in the interval $T_B$ of the black level detecting portion is stored in the capacitor 9 of this low-pass filter.

Since the mean value of the noise becomes zero because the noise is a random signal, the image pickup signal from which the noise in the interval $T_B$ responsive to the black level detecting portion is eliminated is obtained at the output of the low-pass filter consisting of the resistor 6 and capacitor 9 as shown in FIG. 3C. Thus, it is possible to prevent the clamping circuit 15 from being influenced by the noise. Moreover, the low-pass filter can respond to the level drift in the interval $T_B$ corresponding to the black level detecting portion due to a change in temperature or the like.

The present invention can be also applied to the case where any image sensors such as a vidicon or the like other than a CCD are used.

In addition, the present invention is not limited to a video camera but can be also applied to a still camera for recording an image pickup signal on a magnetic disk.

Furthermore, the clamping circuit is not limited to the feedback clamping circuit but any other circuits which are constituted so as to detect the level in the interval $T_B$ responsive to the black level detecting portion from the output of the buffer circuit 11 may be used.

According to the present invention, since the image pickup output signal of which the noise in the interval responsive to the black level detecting portion was eliminated is supplied to the clamping circuit, the level of which the noise was added to the black level is clamped into a predetermined DC potential by the clamping circuit, thereby preventing the appearance of line noise on the screen. Different from a circuit for replacing the interval of the black level detecting portion by a potential which does not include other noise, the present invention enables the drift of the black level of the image pickup output signal due to a change in temperature or the like to be followed.

In addition, the present invention has the advantage that it is not influenced by the sag component caused by AC coupling, such as in case of detecting the mean value of the black levels of the image pickup output signals of a plurality of times.

Furthermore, according to the present invention, a low-pass filter and a switching circuit may be merely added; therefore, the circuit constitution can be simplified and an excellent stable operation is obtained.

What is claimed is:

1. A signal processing circuit comprising:
  an image sensor having an optical black level detecting portion and producing an output signal alternately representing a sensed image and said optical black level;
  a buffer circuit for receiving said output signal and producing a buffer output signal;
  a clamping circuit for receiving said buffer output signal;
  circuit means provided between said buffer circuit and said clamping circuit and capable of assuming a low-pass filter configuration wherein it has a cutoff frequency such that it responds to drift of said optical black level and of assuming a low-impedance configuration; and
  terminal means connected to said circuit means for supplying a signal thereto causing said circuit means to assume said low-pass filter configuration, in an interval corresponding to detection of said optical black level and otherwise to assume said low-impedance configuration.

2. A signal processing circuit according to claim 1, further comprising a coupling capacitor, said buffer output signal being supplied through said coupling capacitor to said clamping circuit and said circuit means being inserted between said buffer circuit and said coupling capacitor.

3. A signal processing circuit according to claim 1, further comprising a buffer circuit provided on the output side of said circuit means.

4. A signal processing circuit comprising:
  an image sensor having an optical black level detecting portion;
  a buffer circuit to which an output signal of said image sensor is supplied;
  a clamping circuit to which an output of said buffer circuit is supplied; and
  a low-pass filter provided between said buffer circuit and said clamping circuit,
  said low-pass filter being made operative in the interval corresponding to said black level detecting portion in the output of said image sensor,
  wherein said low-pass filter comprises a resistor inserted in the signal line and switching means for selecting a first state wherein said resistor is shorted except in the interval responsive to said black level detecting portion and selecting a second state wherein a capacitor is inserted between one end of said resistor and a reference potential point in the interval responsive to said black level detecting portion.

5. A signal processing circuit according to claim 1, wherein the interval corresponding to said black level detecting portion is included in a horizontal blanking interval.

6. A signal processing circuit according to claim 1, wherein said image sensor is a CCD image sensor.

* * * * *